United States Patent [19]

Prokop

[11] Patent Number: 4,784,500

[45] Date of Patent: Nov. 15, 1988

[54] HUB LUBRICATION SYSTEM

[75] Inventor: B. Robert Prokop, Seminole, Okla.

[73] Assignee: Hayes Axle, Inc., Seminole, Okla.

[21] Appl. No.: 68,280

[22] Filed: Jun. 25, 1987

[51] Int. Cl.[4] .......................................... F16C 33/66
[52] U.S. Cl. .................................. 384/462; 384/448; 384/474
[58] Field of Search ............... 384/473, 474, 448, 489, 384/462, 152, 373; 277/29

[56] References Cited

U.S. PATENT DOCUMENTS

| | | | |
|---|---|---|---|
| 553,621 | 1/1896 | Kraus . | |
| 1,719,941 | 7/1929 | Mogford . | |
| 2,514,799 | 7/1950 | Rubertino et al. . | |
| 2,657,104 | 10/1953 | Kayser . | |
| 2,770,507 | 11/1956 | Ehnts . | |
| 3,420,590 | 1/1969 | Bilocq | 384/473 |
| 3,460,874 | 8/1969 | Johnson . | |
| 3,642,327 | 2/1972 | Walther | 301/108 R |
| 3,649,080 | 3/1972 | Molinare | 301/108 R |
| 3,903,992 | 9/1975 | Chivukula et al. | 184/1 D |
| 4,058,185 | 11/1977 | Ploeger | 184/1 D |
| 4,106,816 | 8/1978 | August | 301/108 R |
| 4,172,620 | 10/1979 | Marti . | |
| 4,190,133 | 2/1980 | Ploeger | 184/1 D |
| 4,453,698 | 6/1984 | De Frees | 277/29 |

OTHER PUBLICATIONS

Advertising Flier (1 page) of Reliable Tool & Machine Co., Inc., Kendallville, Ind.
Advertising Brochure (3 pages) relating to Bearing Buddy of Unique Funtional Products, San Marcos, Calif.
Advertising Brochure (3 pages) relating to Hydro--Guard of Wilton Corporation, Winchester, Tenn.
Advertising Flier (1 page) relating to E-Z Lube from Dexter Axle Division of Philips Industries, Inc., Elkhart, Ind.
Advertising Brochure (2 pages) of Hayes Axle, Inc., Seminole, Okla.
Advertising Brochure (2 pages) relating to Rev Lube Hubs from Mart, Inc.

Primary Examiner—Lenard A. Footland
Attorney, Agent, or Firm—Renner, Kenner, Grieve, Bobak, Taylor & Weber

[57] ABSTRACT

A hub-axle assembly (10) and lubrication system thereof includes a spindle (11) having an inner end (12) and outer end (15) with inner (13) and outer (14) bearing assemblies spaced axially on the spindle (11). A hub body (16) is rotatably supported on the bearing assemblies (13, 14) and has a wheel mounting flange (17) extending radially outward therefrom. Lug bolts (18) extend axially outward from the flange (17) with one such lug bolt (18) having an axial bore (24) therein. Grease applied at a grease fitting (23) in the axial bore (24) is transmitted to a lubrication chamber (19) within the hub body (16) via tubing (25) to lubricate the lubrication chamber (19). A circumferential recess (27) in the hub body (16) has at least one aperture (28) therein which is normally closed by an O-ring (29) positioned in the recess (27). However, when the pressure of the grease within the hub body (16) is sufficient to indicate that the lubrication chamber (19) has been lubricated, the O-ring (29) will expand causing grease to flow through the aperture (28).

28 Claims, 1 Drawing Sheet

4,784,500

HUB LUBRICATION SYSTEM

TECHNICAL FIELD

This invention relates to a system for lubricating axle-hub assemblies of vehicles. More particularly, this invention relates to such a system wherein complete greasing of the axle-hub assembly can be efficiently, conveniently and economically accomplished.

BACKGROUND ART

Conventional axle-hub assemblies include a stationary axle or spindle which supports spaced front and rear bearings which, in turn, support a rotatable hub. When greasing these axle-hub assemblies, and particularly those which may be submersed in water as, for example, in the situation of a hub assembly for a boat trailer, it is important that grease is applied to both the front and rear bearings and to otherwise effect a complete lubrication of the axle-hub assemblies.

To date, no system has been economically developed which conveniently and efficiently assures the user that the entire axle-hub assembly has been greased. One existing system requires that an axial bore be drilled substantially along the entire length of the spindle. Grease is applied into the axial bore through an opening in the end cap, travels through the entire axial bore and exits the same through radial bores in the spindle at a location behind the inner bearings. The grease then travels back through the inner bearings, between the hub and the spindle, through the outer bearings, and into the open end cap where it can be observed by the user indicating a complete greasing.

Such a system has been found to be deficient in many regards. First, the manufacture thereof is quite expensive requiring the time-consuming drilling of the axial bore and a special end cap having an aperture therein and means to seal the same. Further, application of the grease takes longer inasmuch as it must first travel from the end cap through the entire length of the spindle and then back to the end cap. In addition, with the grease entry and exit points being at the same general location, the messy discharge of grease onto the users hands cannot usually be avoided.

Another existing system is shown in U.S. Pat. No. 4,172,620. There, grease is introduced through the hub behind the wheel support portion thereof. The grease then passes through the inner bearing, then between the spindle and the hub, then through the outer bearings, and then out through a special opening in the end cap to provide an indication of complete greasing of the assembly. Such a system is inconvenient for the user in that he must reach blindly behind the wheel support portion of the hub to locate the grease fitting. Further, a special end cap is required to permit grease to pass therethrough, which passage also exposes the user to the grease.

DISCLOSURE OF THE INVENTION

It is thus a primary object of the present invention to provide a convenient, economical and efficient system for completely lubricating a hub assembly.

It is another object of the present invention to provide a system, as above, in which the grease application point is conveniently accessible to the user and yet the grease is admitted to the hub behind the inner bearings.

It is a further object of the present invention to provide a system, as above, which gives a visual indication of complete greasing of the bearings of the hub at a location in front of the outer bearings without undue discharge of grease.

These and other objects of the present invention, which will become apparent from the description to follow, are accomplished by the improvements hereinafter described and claimed.

In general, a hub assembly includes a spindle having an inner end attachable to an axle and an outer free end. Inner and outer sets of bearings are spaced along the spindle and rotatably carry a hub body which encases the spindle. A wheel mounting flange extends radially outwardly from the hub body with lug bolts extending axially outwardly from the flange. The system for lubricating the hub assembly includes means to introduce grease within the hub body at a location on one side of one of the sets of bearings, as by a grease fitting mounted in one of the lug bolts, along with means to transfer the grease to the hub body. The system also includes means to permit the controlled discharge of the grease from the hub body to indicate a greasing of the hub assembly, as by providing a circumferential recess in the hub body at a location on the outer side of the one set of bearings, the recess having an opening therein, and as by providing means to close the opening while permitting the controlled discharge of grease therethrough.

PREFERRED EMBODIMENTS FOR CARRYING OUT THE INVENTION

Figure 1:
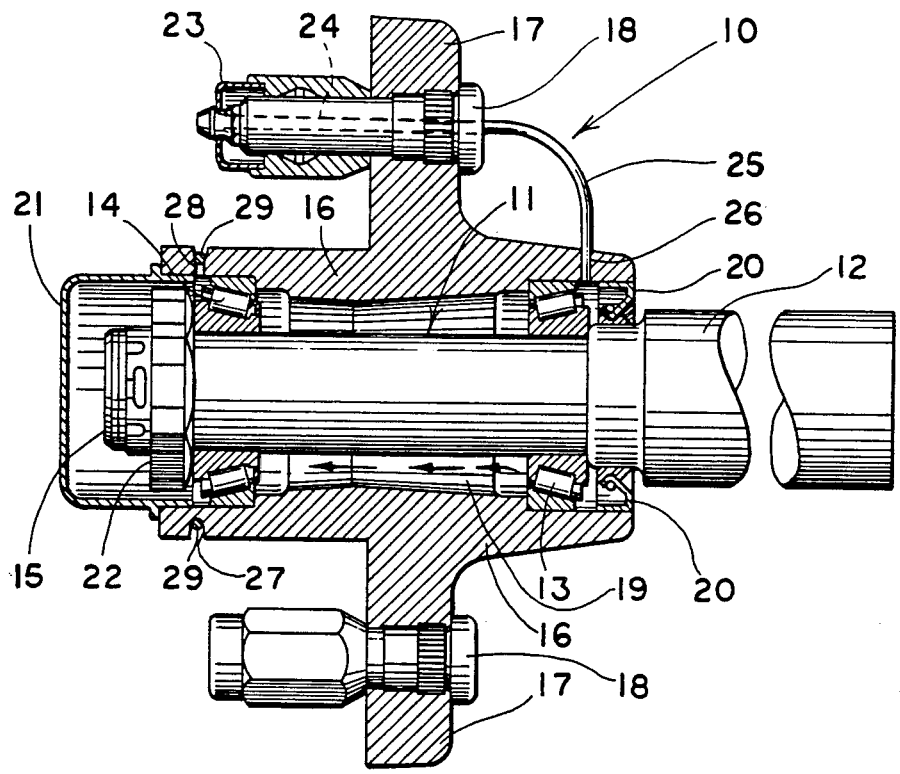
FIG. 1 is a sectional view of a hub assembly having the lubrication system of the present invention.

A hub assembly including the lubrication system of the present invention is indicated generally by the numeral 10 in FIG. 1. While hub assembly 10 is of the type which can be used for the stationary axle of any vehicle, hub assembly 10 is most typically used for towed vehicles such as trailers or the like.

Hub assembly 10 includes a spindle indicated generally by the numeral 11 which is attachable in a conventional manner at its inner end 12 to the stationary axle of the vehicle. Hub assembly 10 also includes a conventional inner bearing assembly 13 adjacent inner end 12 of spindle 11 and an outer bearing assembly 14 spaced from bearing assembly 13 and generally adjacent the outer end 15 of spindle 11. Bearing assemblies 13 and 14 rotatably support a hub body 16 in a conventional manner. A wheel mounting flange 17 extends radially outward from hub body 16 and is provided with a plurality of lug bolts 18 for attachment to a wheel in a conventional manner. Hub body 16 of hub assembly 10 thus forms, with spindle 11, a lubrication chamber 19 closed on the inner end by conventional seals 20 and at the outer end by an enclosure in the form of cap 21. A spindle nut 22 holds the hub body 16 in place on spindle 11.

It is important, particularly in situations where the hub assembly may be submersed in water, that lubrication chamber 19, and in particular inner bearing assembly 13 and outer bearing assembly 14, be maintained lubricated with grease. To that end, a conventional grease fitting 23 is pressed into one of the lug bolts 18 so that it is conveniently accessible to the user. A bore 24 is drilled through the lug bolt 18 associated with fitting 23 and tubing 25 is attached to the inner end of bolt 18 thus communicating with bore 24. Tubing 25 is designed to convey grease applied at fitting 23 to lubrication chamber 19 and, as such, as shown in FIG. 1, tubing 25 extends through hub body 16, as at 26, preferably at a location inwardly of inner bearing assembly 13, that is, between bearing assembly 13 and seals 20.

Grease applied at fitting 23 travels through bore 24 of lug bolt 18, through tubing 25 and into chamber 19. Continued pressurized application of grease causes it to flow through and lubricate inner bearings 13, continue moving through chamber 19 in the direction of the arrows in FIG. 1, and be forced through outer bearings 14 thereby lubricating the same and completely lubricating the system.

In order to provide a visual indication of such complete lubrication, hub body 16 is provided with a circumferential recess 27 preferably located on the outer side of outer bearing assembly 14, that is, between bearings 14 and end cap enclosure 21. Recess 27 communicates with lubrication chamber 19 by means of at least one radial bore 28 therein. Radial bore 28 is closed by an O-ring 29 positioned in recess 27. O-ring 29 is, however, of such elasticity and is thus expandable so as to permit grease to seep through radial bore 28 and thus appear around O-ring 29 when a certain predetermined pressure, such as ten p.s.i., has been exceeded within chamber 19. O-ring 29 therefore, while sealing bore 28, provides for the controlled discharge of grease giving the operator a visual indication that complete lubrication has taken place.

As previously indicated, any number of bores 28 may be provided depending on the particular application involved. However, it has been found convenient to provide at least one of the bores 28, as is shown in FIG. 1, at the circumferential point in recess 27 which is generally coincident with the circumferential point of the lug bolt 18 having the grease fitting 23 therein so that the operator can readily and quickly determine that complete greasing has taken place.

In the embodiment shown in FIG. 1 and in certain applications, grease may well appear around O-ring 29 before the end cap enclosure 21 is filled with grease. While this is normally not detrimental because the indication of grease indicates the complete lubrication of both bearing assemblies 13 and 14, an air pocket could be formed in enclosure cap 21 and could expand, due to the buildup of heat during the operation of the vehicle, and cause a bit more grease to be emitted through bores 28. If it is desirable to avoid this unsightly occurrence, an enclosure, indicated generally by the numeral 30 and shown in FIG. 2, may be provided.

Enclosure 30 is designed to be used with a hub assembly 10 as shown in FIG. 1 and described herein. In the FIG. 2 embodiment, however, enclosure 30 includes an annular sidewall 31, a radially directed spring bearing shoulder 32 near the outer end of sidewall 31, and an axially directed annular flange 33. The space between sidewall 31 and flange 33 serves to confine a coil spring 34 which bears on one side on shoulder 32 and which inwardly biases a piston member generally indicated by the numeral 35.

Piston 35 includes a number of stepped surfaces including surface 36 bearing against spring 34 and adjacent annular surface 37 bearing against and slidable along the inner surface of flange 33. Second stepped surfaces of piston 35 include a radially directed surface 38 and an axially directed surface 39 which together radially and axially confine a sealing O-ring 40. O-ring 40 is additionally axially confined by an annular lip 41 extending axially from a piston cap 42 of enclosure 30 which in its normal position rests against the axially outer edge of flange 33. Lip 41 of cap 42 is press fit and attached, as by glue, to surface 39 of piston 35 so that cap 42 and piston 35 will move together.

Figure 2:
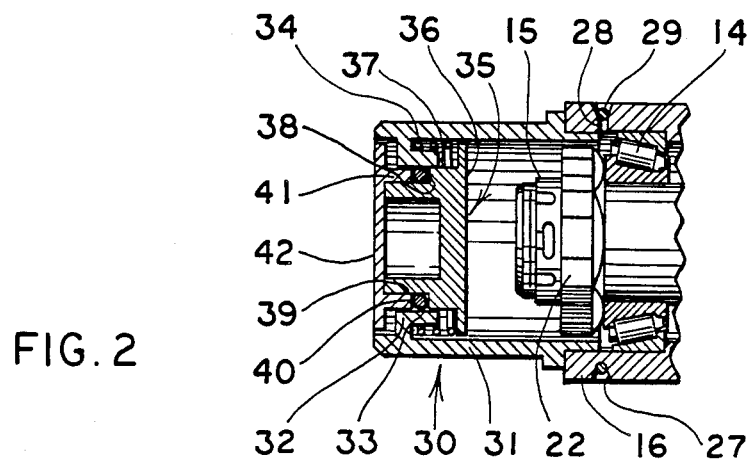
FIG. 2 is a fragmented view of an alternative end cap enclosure for the hub assembly of FIG. 1.

In the FIG. 2 embodiment, as grease under pressure passes through outer bearing assembly 14 and begins to build up pressure on O-ring 29, it will, of course, also pass into the area of enclosure 30 and begin to exert pressure on piston 35. Based on the size of piston 35 and with proper selection of the spring 34, as could be determined by one of ordinary skill in the art, piston 35 will be essentially completely displaced moving cap 42 away from the outer edge of flange 33 before the grease displaces O-ring 29 sufficiently to appear within recess 27. As piston 35 and cap 42 move to the left in FIG. 2, O-ring 40 slides along the radially inner surface of flange 33 and thereby provides a seal so that no grease can pass thereby. At this point the operator may discontinue applying grease under pressure at fitting 23 and by manually pushing cap 42 inwardly, that is, returning piston 35 to the position shown in FIG. 2, further grease may be discharged through bores 28 and more potential air pockets in chamber 19 eliminated. While smaller air pockets may still be present in chamber 19, by utilizing the enclosure configuration shown in FIG. 2, when expansion occurs due to heat up during operation of the vehicle, piston 35 will be displaced to account for such expansion and no unsightly grease will be discharged through bores 28.

As has been previously described, the hub lubrication system of the present invention is particularly suited for hub-axle assemblies which might be submersed in water where complete greasing is important, such as those assemblies used on boat trailers. It should be appreciated, however, that the present invention has applications to other situations where air pockets are not as severe a problem. For example, without departing from the spirit of this invention, the cap 42 and piston 35 shown in FIG. 2 could be provided with an axial bore and a grease fitting inserted therein to supply grease on one side of outer bearings 14. In this instance the circumferential recess 27 would be located in hub body 16 on the other side of outer bearings 14 and grease would be discharged through bores 28 to indicate that lubrication chamber 19 was completely greased.

It should thus be evident that a hub lubrication system constructed according to the concept of the present invention, as described herein, substantially improves the art and otherwise accomplishes the objects of the present invention.

I claim:

1. A system for lubricating a hub assembly, said hub assembly including a spindle having an inner end attachable to an axle and an outer free end, inner and outer bearing assemblies spaced along said spindle, a hub body around said spindle and rotatable on said bearing assemblies, and a wheel mounting flange extending radially outwardly of said hub body and having lug bolts extending axially outwardly therefrom; the system comprising a grease fitting mounted in one of said lug bolts; means to transfer grease applied at said grease fitting to a location internally of said hub body on the inner side of said inner bearing assembly; and means permitting the controlled discharge of grease from said hub body to indicate a complete greasing of the hub assembly.

2. A system according to claim 1 wherein said means to transfer grease includes an axial passageway in said one of said lug bolts extending from said grease fitting and entirely through said one of said lug bolts, and tubing communication with said passageway to transfer grease to said location internally of said hub body.

3. A system according to claim 1 wherein said hub assembly further includes a seal on the inside of said inner bearing assembly, the grease being transferred by said means to transfer grease to a location axially between said inner bearing assembly and said seal.

4. A system according to claim 1 wherein said hub assembly further includes an enclosure over the outer free end of said spindle, said means permitting the controlled discharge of grease being located between said enclosure and said outer bearing assembly.

5. A system according to claim 4 wherein said means permitting the controlled discharge of grease includes at least one opening in said hub body for grease within said hub body to pass therethrough, and means to close said opening while permitting the controlled discharge of grease therethrough.

6. A system according to claim 5 wherein said means permitting the controlled discharge of grease includes a circumferential recess in said hub body, said opening in said hub body being in said recess, said means to close said opening including an O-ring selectively expansible under the pressure of the grease to permit the controlled discharge of grease through said opening.

7. A system according to claim 6 further comprising piston means in said enclosure, and biasing means urging said piston means toward said spindle, the force of said biasing means and the elasticity of said O-ring being such that the grease will displace said piston means prior to expanding said O-ring.

8. A system of lubricating a hub assembly, said hub assembly including a spindle having an inner end attachable to an axle and an outer free end, inner and outer bearing assemblies spaced along said spindle, and a hub body around said spindle and rotatable on said bearings; the system comprising means to introduce grease within said hub body a circumferential recess in the outside of said hub body at an axial location on the outer side of said outer bearing assembly; at least one opening in said recess for grease within said hub body to pass therethrough; and means in said recess to close said opening while permitting the controlled discharge of grease therethrough to indicate a complete greasing of the hub assembly.

9. A system according to claim 8 wherein said hub assembly includes an enclosure over the outer free end of said spindle, said circumferential recess being axially located between said enclosure and said outer bearing assembly.

10. A system according to claim 9 wherein said means in said recess includes an O-ring expansible under the pressure of the grease in said hub body to permit the controlled discharge of grease through said opening.

11. A system according to claim 10 further comprising piston means in said enclosure, and biasing means urging said piston means toward said spindle, the force of said biasing means and the elasticity of said O-ring being such that the grease will displace said piston means prior to expanding said O-ring.

12. A system according to claim 8 wherein said hub assembly includes seal means axially inward of said inner bearing assembly, said means to introduce grease within said hub body introducing the same between said seal means and said inner bearing assembly.

13. A system according to claim 12 wherein said hub assembly includes a wheel mounting flange extending radially outwardly of said hub body and having lug bolts extending axially outwardly therefrom, said means to introduce grease including a grease fitting mounted in one of said lug bolts, a passageway in said one of said lug bolts communicating with said grease fitting, and means communicating with said passageway to transfer grease applied at said grease fitting to said hub body.

14. A hub-axle assembly comprising a spindle having an inner end attachable to the axle and a outer free end, inner and outer bearing assemblies spaced along said spindle, a hub body around said spindle and rotatable on said bearing assemblies, a wheel mounting flange extending radially outwardly of said hub body, means to introduce grease through said wheel mounting flange and to a location internally of said hub body, a recess in the outside of said hub body, at least one opening in said recess for grease within said hub body to pass therethrough, and means in said recess to close said opening while permitting the controlled discharge of grease therethrough so that when grease is introduced under pressure to said hub body some grease will pass through said opening when said inner and outer bearing assemblies are greased.

15. A hub-axle assembly according to claim 14 further comprising a seal around said spindle on the axially inner side of said inner bearing assembly, said location internally of said hub body for the introduction of grease being between said seal and said inner bearing assembly.

16. A hub-axle assembly according to claim 14 further comprising lug bolts extending axially outwardly from said wheel mounting flange, one of said lug bolts having an axial bore therein extending from the outer side to the inner side thereof, said means to introduce grease including a grease fitting mounted at the outer side of said one of said lug bolts and communicating with said axial bore, and means communicating with said axial bore at the inner side of said one of said lug bolts to transfer grease introduced at said grease fitting to said location internally of said hub body.

17. A hub-axle assembly according to claim 14 wherein said means in said recess is an O-ring selectively expansible to permit the controlled discharge of grease through said opening.

18. A hub-axle assembly according to claim 14 further comprising an enclosure positioned on the axially outer side of said outer bearing assembly and around said free end of said spindle, said recess being positioned in said hub body between said enclosure and said outer bearing assembly.

19. A hub-axle assembly according to claim 18 further comprising piston means in said enclosure and being displaced by the pressure of the grease.

20. A hub-axle assembly according to claim 19 further comprising means to bias said piston means toward said free end of said spindle.

21. A hub-axle assembly according to claim 20 wherein said means in said recess is an O-ring providing a force over said opening, the force of said O-ring being greater than the force of said biasing means so that said piston means is displaced before said O-ring permits the controlled discharge of grease through said opening.

22. A system of lubricating a hub assembly, said hub assembly including a spindle having an inner end attachable to an axle and an outer free end, inner and outer bearing assemblies spaced along said spindle, an enclosure over the outer free end of said spindle, and a hub body around said spindle and rotatable on said bearings to form with said enclosure a lubrication chamber; the system comprising means to introduce grease into said lubrication chamber on one side of one of said bearing assemblies; a circumferential recess in said hub body at an axial location on the other side of said one of said bearing assemblies; at least one opening in said recess for grease within said lubrication chamber to pass therethrough; and means in said recess to close said opening while permitting the controlled discharge of grease therethrough to indicate a complete greasing of said lubrication chamber.

23. A system according to claim 22 wherein said means in said recess includes an O-ring expansible under the pressure of the grease in said hub body to permit the controlled discharge of grease through said opening.

24. A system according to claim 23 further comprising piston means in said enclosure, and biasing means urging said piston means toward said spindle, the force of said biasing means and the elasticity of said O-ring being such that the grease will displace said piston means prior to expanding said O-ring.

25. A system of lubricating a hub assembly, said hub assembly including a spindle having an inner end attachable to an axle and an outer free end, inner and outer bearing assemblies spaced along said spindle, an enclosure over the outer free end of said spindle, a hub body around said spindle and rotatable on said bearings to form with said enclosure a lubrication chamber, and a wheel mounting flange extending radially outwardly of said hub body and having lug bolts extending axially outwardly therefrom; the system comprising a grease fitting mounted at the outer side of at least one of said lug bolts, an axial bore through said one of said lug bolts communicating with said grease fitting, means connected to the inner side of said one of said lug bolts to transfer grease to a location internally of said lubrication chamber, and at least one opening in said lubrication chamber through which grease may pass to indicate a complete greasing of said lubrication chamber.

26. A system according to claim 25 further comprising a seal around said spindle on the axially inner side of said inner bearing assembly, said means connected to the inner side of said one of said lug assemblies transferring grease to said lubrication chamber between said seal and said inner bearing assembly.

27. A system according to claim 25 wherein said opening in said lubrication chamber is located axially outwardly of said outer bearings.

28. A system according to claim 27 further comprising means to temporarily close said opening.

* * * * *